United States Patent [19]

Reza

[11] Patent Number: 4,471,400
[45] Date of Patent: Sep. 11, 1984

[54] PROTECTION OF APPLIANCES AGAINST REVERSAL OF BATTERY POLARITY

[76] Inventor: Agha A. Reza, Bahrain Automotive Electrical Services and Spare Parts, A1 Lulu St., Manama, Bahrain

[21] Appl. No.: 442,560

[22] Filed: Nov. 18, 1982

Related U.S. Application Data

[63] Continuation of Ser. No. 85,375, Oct. 16, 1979, abandoned, which is a continuation of Ser. No. 832,666, Sep. 12, 1977, abandoned.

[30] Foreign Application Priority Data

Sep. 10, 1976 [GB] United Kingdom ............... 37700/76

[51] Int. Cl.$^3$ .................................................. H02H 3/18
[52] U.S. Cl. ........................................ 361/77; 361/88; 361/187; 320/25; 307/10 BP; 340/636
[58] Field of Search ................. 361/77, 56, 88, 1, 187, 361/86; 320/25, 30, 33, 53, 29, 26, 48; 307/10 BP, 10 SB, 127; 340/636, 660, 661

[56] References Cited

U.S. PATENT DOCUMENTS

| | | | |
|---|---|---|---|
| 3,307,097 | 2/1967 | Brewster | 320/25 |
| 3,308,365 | 3/1967 | St. John | 320/25 |
| 3,313,995 | 4/1967 | Bach et al. | 361/77 X |
| 3,371,330 | 2/1968 | Howard et al. | 340/636 X |
| 3,659,183 | 4/1972 | Carlson | 320/25 |
| 3,784,972 | 1/1974 | Hults | 307/10 SB X |

FOREIGN PATENT DOCUMENTS

| | | | |
|---|---|---|---|
| 61508 | 12/1948 | United Kingdom . | |
| 822521 | 10/1959 | United Kingdom . | |
| 1062134 | 3/1967 | United Kingdom | 320/25 |
| 1132797 | 6/1968 | United Kingdom . | |
| 1270799 | 4/1972 | United Kingdom . | |
| 1356480 | 6/1974 | United Kingdom . | |

*Primary Examiner*—Patrick R. Salce
*Attorney, Agent, or Firm*—Armstrong, Nikaido, Marmelstein & Kubovcik

[57] ABSTRACT

A device for protecting a battery driven electrical appliance against reversal of battery polarity comprises switching means, for connection into the supply circuit of the appliance to be protected, and a series combination of an electrical control for the switching means and a unidirectional semiconductor means, said combination having a first terminal connected to a supply terminal of the switching means and a second terminal for connection to a supply from the battery of polarity opposite that of the said supply terminal, for operating the switching means to interrupt supply of current to the appliance in the event of reversal of battery polarity.

5 Claims, 1 Drawing Figure

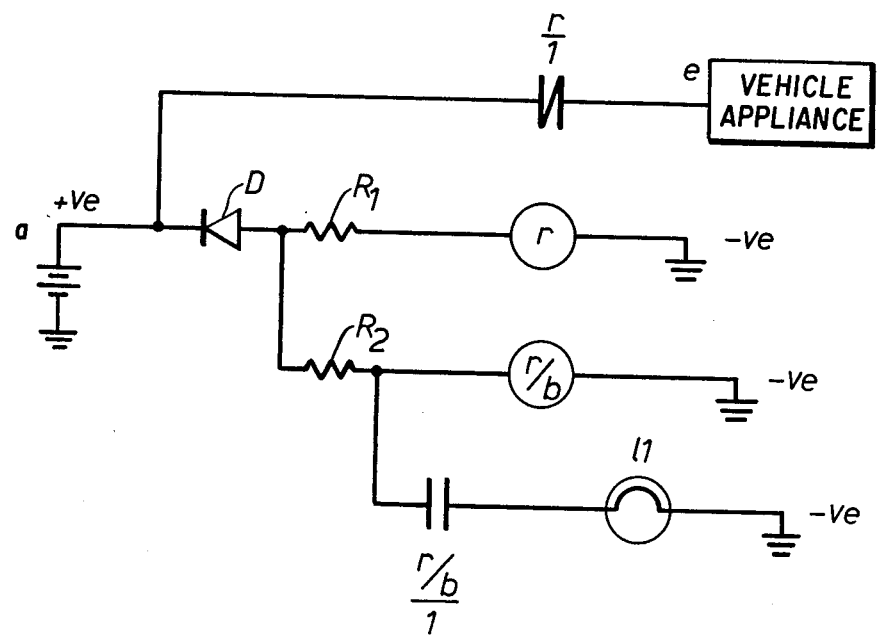

PROTECTION OF APPLIANCES AGAINST REVERSAL OF BATTERY POLARITY

This is a continuation of application Ser. No. 85,375, filed Oct. 16, 1979 which is a continuation of Ser. No. 832,666, filed Sept. 12, 1977; now both abandoned.

The present invention relates to protection of appliances against reversal of battery polarity.

According to the present invention there is provided a device for protecting a battery driven electrical appliance against reversal of battery polarity comprising switching means arranged for connection into the supply circuit of the appliance to be protected and a series combination comprising an electrical control for the switching means and a unidirectional semiconductor means, the combination having a first terminal, connected to a supply terminal of the switching means and a second terminal arranged for connection to a supply from the battery of polarity opposite that of the said supply terminal such that in the event of reversal of battery polarity the electrical control operates the switching means to interrupt supply of current to the appliance.

The FIGURE is a schematic circuit diagram of the circuit of the present invention.

Reference will now be made, by way of example, to the accompanying drawing which shows circuitry of a device embodying the present invention.

The contact assembly (r/1) of a normally closed relay is connected between a supply terminal a (connected to the positive terminal of a battery B of a motor vehicle) and an output terminal e which is connected to deliver a supply current to the vehicle electrical system including appliances and equipment E which may include one or more of the following appliances: an alternator, a transistorized regulator, a car radio and/or tape recorder fitted in the vehicle. However, the device would not be put in connection with a starter motor assembly of the vehicle. A series combination comprising a unidirectional diode D, a protective resistance $R_1$ and a control relay coil assembly r of the normally closed relay is connected between the terminal a and an Earth terminal, connected for example to a metal body structure of the vehicle which structure is in turn connected to the negative terminal of the vehicle battery. The diode D is connected so that it would offer low resistance to an electrical current flowing from the Earth terminal to the terminal a. Thus the device is normally in a condition such that the diode is not conducting electrical current.

A series combination comprising a protective resistance $R_2$ and a control relay coil assembly r/b of a relay-buzzer (the relay of which is normally open) is connected between a further Earth terminal and a connection point between the diode D and the resistance $R_1$. A series combination of a warning lamp 11 and a contact assembly (r/b/1) of the normally open relay is connected between a further Earth terminal and a connection point between resistance $R_2$ and the control relay coil assembly r/b.

In the event that there is reversal of battery polarity, for example during repairs or servicing of the vehicle, so that the positive terminal of the battery is connected to the metal body structure constituting "Earth", and the negative terminal of the battery is connected to terminal a, diode D allows flow of current from the Earth terminals to terminal a so that the control relay coil assemblies r and r/b receive an electrical current so that the relays are energized, the contacts of the normally closed relay being automatically opened and the contacts of the normally open relay being automatically closed. Thus the supply circuit for the aforesaid vehicle electrical system is broken, and at the same time the buzzer of the relay-buzzer r/b is operated, and the warning lamp 11 is turned on so that audible and visual warning is given. The device remains in this condition for as long as the incorrect battery polarity connection is maintained, and is not restored to its normal condition, in which current can be supplied to the vehicle electrical system through contact assembly (r/1), until the battery is connected properly with its positive terminal connected to terminal a.

I claim:

1. A battery-driven electrical circuit for a vehicle for providing protection against reversal of battery polarity, the circuit comprising a battery, a first connection point, one pole of the battery being connected thereto, a load comprising at least one electrical appliance, a first branch having switching contact means connected between the battery and said load and providing the sole current carrying path between said connection point and the load, and a second branch connected to said first connection point so as to be in parallel with said first branch and said load and comprising a combination of electrical control means for controlling the opening and closing of the switching contact means, and a single unidirectionally conductive means arranged so as to be in a blocking condition relative to the driving potential of the battery polarity, the unidirectionally conductive means conducts, whereby the electrical control means operates the switching contact means to open the first branch and thereby prevent the supply of any current to the load, and warning means having third and fourth sub-branches connected with said unidirectionally conductive means and in parallel with said electrical control means, wherein said warning means are continuously energized in response to the conduction of said unidirectionally conductive means so as to provide a continuous warning in the event of reversal of the battery polarity, said warning means comprising a relay-buzzer means having a first contact assembly and first relay coil, said warning means also comprising a lamp connected with the first contact assembly so as to provide a visual warning in the event of reversal of battery polarity, said switching contact means comprising a normally closed contact assembly of a relay, and the electrical control means comprising a control coil assembly of said relay, and wherein the unidirectionally conductive means comprises a diode, said second branch comprising a combination of the diode, a first protective resistance and said control coil assembly of the said relay, the third sub-branch including a second combination, comprising a second protective resistance, and said first relay coil for the relay-buzzer means, and the fourth sub-branch comprising the first contact assembly for the lamp, and the lamp; said third and fourth sub-branches having a common resistance connected to the diode.

2. The battery-driven electrical circuit of claim 1 in which the third and the fourth sub-branches are in parallel with said control coil assembly of said relay for the electrical control means.

3. A device as claimed in claim 2, further comprising a lamp connected between a terminal of the device and the said combination at a connection point between the said electrical control means and the said unidirectional semi-conductor means, in such a manner that reversal of battery polarity causes the lamp to give a visual warning.

4. A device as claimed in claim 3, further comprising a lamp connected between a terminal of the device and said connection point and connected in series with the normally open contact assembly of the relay-buzzer.

5. A device as claimed in claim 4, wherein the said switching contact means are connected in a supply circuit of said appliance mounted in or on a motor vehicle.

* * * * *

UNITED STATES PATENT AND TRADEMARK OFFICE
CERTIFICATE OF CORRECTION

PATENT NO. : 4,471,400

DATED : September 11, 1984

INVENTOR(S) : Agha A. Reza

It is certified that error appears in the above-identified patent and that said Letters Patent is hereby corrected as shown below:

In Claim 1, in line 16 thereof, between "battery" and "polarity", insert:
--under normal operation, wherein in the event of reversal of battery--.

Signed and Sealed this

Twenty-first Day of May 1985

[SEAL]

Attest:

DONALD J. QUIGG

Attesting Officer    Acting Commissioner of Patents and Trademarks